Sept. 11, 1923.  J. F. PRAX  1,467,651
BATTERY CONNECTION
Filed June 30, 1920
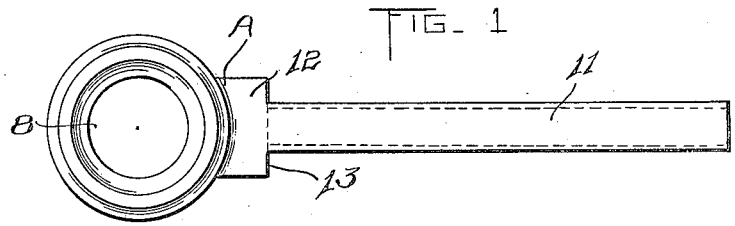
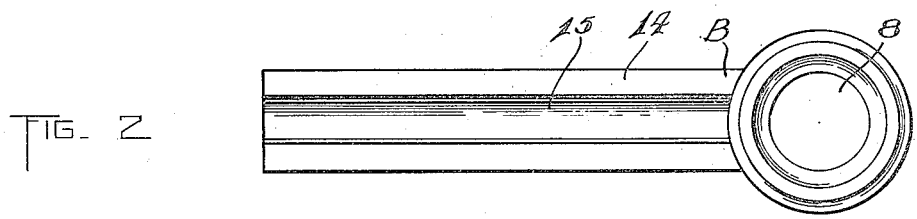
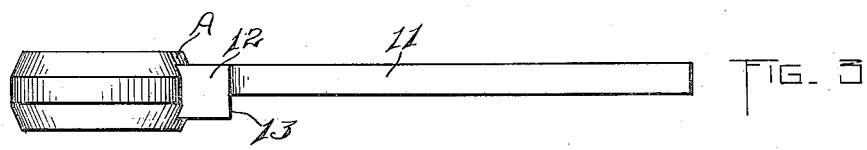
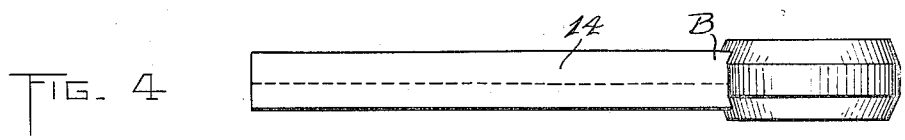
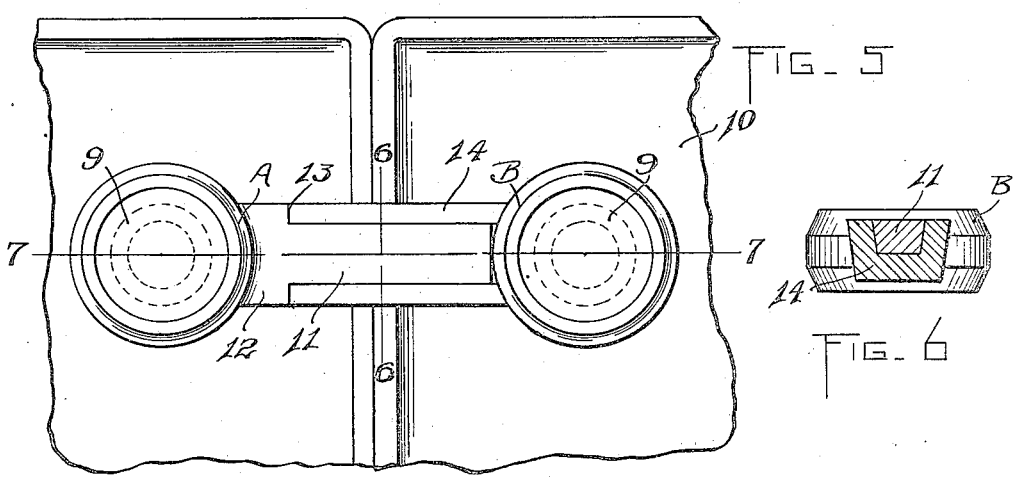
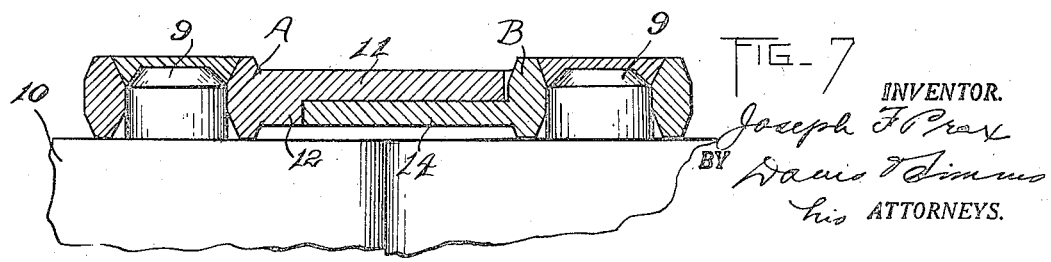

Patented Sept. 11, 1923.

1,467,651

UNITED STATES PATENT OFFICE.

JOSEPH F. PRAX, OF ROCHESTER, NEW YORK.

BATTERY CONNECTION.

Application filed June 30, 1920. Serial No. 393,146.

*To all whom it may concern:*

Be it known that I, JOSEPH F. PRAX, a citizen of the United States, and resident of Rochester, in the county of Monroe and State of New York, have invented certain new and useful Improvements in Battery Connections, of which the following is a specification.

The present invention relates to a battery connection and more particularly to a connection designed for connecting the cells of the battery, an object thereof being to provide a construction which may be readily adapted to the distance between two cell terminals which are to be connected together.

To this and other ends, the invention consists of certain parts and combinations of parts all of which will be hereinafter described, the novel features being pointed out in the appended claims.

In the drawings:

Figs. 1 and 2 are plan views of the two members of the connector;

Figs. 3 and 4 are side views of the two members of the connector;

Fig. 5 shows the connector connecting the terminals of two cells;

Fig. 6 is a section through the connector on the line 6—6, Fig. 5; and

Fig. 7 is a vertical section on the line 7—7, Fig. 5.

According to this invention, the battery connection embodies two members, each of which has a means for connecting with the cell terminal and a means by which it may be adjustably connected to the other, so that the distance between the cell attaching means of the two members may be varied to correspond to the distance between two cell terminals.

In the illustrated embodiment of the invention A indicates one member of the connection and B the other member. Each of the members is provided with means preferably in the form of a socket 8 adapted to be fitted over and to be secured to a terminal 9 of a battery cell 10. The member A has a lateral extension provided with an outer reduced portion 11 and an inner portion 12, a shoulder or abutment 13 being provided at the inner end of the reduced portion, one wall of this reduced portion being flush with a wall of the inner portion 12 and two other longitudinal walls being converging. The member B has a lateral extension 14 formed with a groove 15 in one face having its side walls converging toward the bottom of the groove. Both members are made of soft metal such as zinc or lead and may be readily cut so that the distance between the terminal openings 8 may be made to correspond to the distance between the terminals 9 of two cells. After the members have been cut an equal amount to properly adjust the distance between the openings 8, the member A has its reduced portion 11 fitted in the longitudinally extending groove 15 of the member B and soldered in place therein either by an additional solder or by heating the two members to cause them to fuse together.

From the foregoing it will be seen that there has been provided a battery connector for connecting terminals of two cells of the battery. This connector is adapted to have the distance between its terminal receiving openings vary to correspond to the distance between the cell terminals which it is to connect. This construction does away with the making of a number of connectors of different lengths as has heretofore been the custom. It permits the making of a standard connector and the adjustment of such connector to the conditions which it is to meet.

What I claim as my invention and desire to secure by Letters Patent is:

1. A battery connector comprising two members composed of readily fusible soft metal and each having an eye at one end for connection with the battery terminal and an extension, one of said extensions being formed with a longitudinally extending groove, on one side extending to the outer end of said extension and the other being formed with a reduced outer end received within said groove and a shoulder at the inner end of the reduced portion acting as an abutment for the outer end of the grooved portion.

2. A battery connector comprising two members, composed of readily fusible soft metal and each of which has an eye at one end for connection with the battery terminal and an extension, one of said extensions being formed with a longitudinally extending groove, on one side extending to the outer end of said extension the walls of said groove converging toward the bottom of such groove and the other of which has a portion with converging walls to fit the converging walls of the groove.

JOSEPH F. PRAX.